United States Patent [19]

Clark

[11] 3,992,172
[45] Nov. 16, 1976

[54] SEPARATOR ARRANGEMENT FOR START-UP SYSTEM

[75] Inventor: Charles R. Clark, Oradell, N.J.

[73] Assignee: Foster Wheeler Energy Corporation, Livingston, N.J.

[22] Filed: Mar. 6, 1975

[21] Appl. No.: 556,038

[52] U.S. Cl. .................. 55/427; 55/455; 55/458; 55/459 C; 55/DIG. 22; 55/DIG. 23; 122/34; 122/488; 55/184; 55/204
[51] Int. Cl.² .................................. B01D 45/12
[58] Field of Search ............ 55/184, 201, 204, 422, 55/423, 426, 427, 447, 455, 458, DIG. 22, DIG. 23, 459; 122/488, 34

[56] References Cited
UNITED STATES PATENTS

| | | | |
|---|---|---|---|
| 756,942 | 4/1904 | Duck | 55/423 X |
| 768,190 | 8/1904 | Naylor, Jr. | 55/422 X |
| 970,477 | 9/1910 | Dunn | 55/422 |
| 2,418,381 | 4/1947 | Wegmann | 55/455 X |
| 2,582,423 | 1/1952 | Foley | 55/426 |
| 2,998,100 | 8/1961 | Pike | 55/458 |
| 3,296,779 | 1/1967 | Daman et al. | 55/447 X |

Primary Examiner—Frank W. Lutter
Assistant Examiner—David L. Lacey
Attorney, Agent, or Firm—Marvin A. Naigur; John E. Wilson

[57] ABSTRACT

A fluid separating apparatus in which an inlet is disposed in the upper portion of a substantially vertically oriented cylindrical housing for receiving a mixture of liquid and vapor. The mixture is separated in the housing by the application of centrifugal forces to the mixture and the liquid exits from the lower portion of the housing and the vapor rises and exits from the upper portion of the housing.

6 Claims, 5 Drawing Figures

FIG.1.
FIG.2.
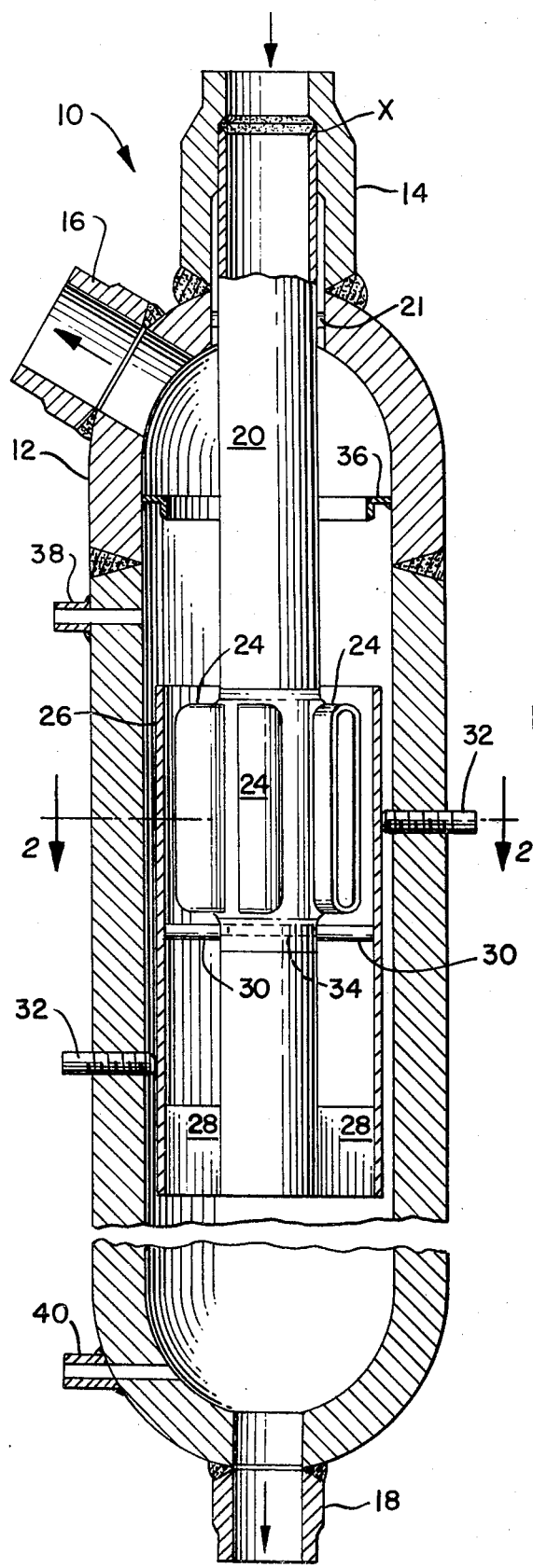
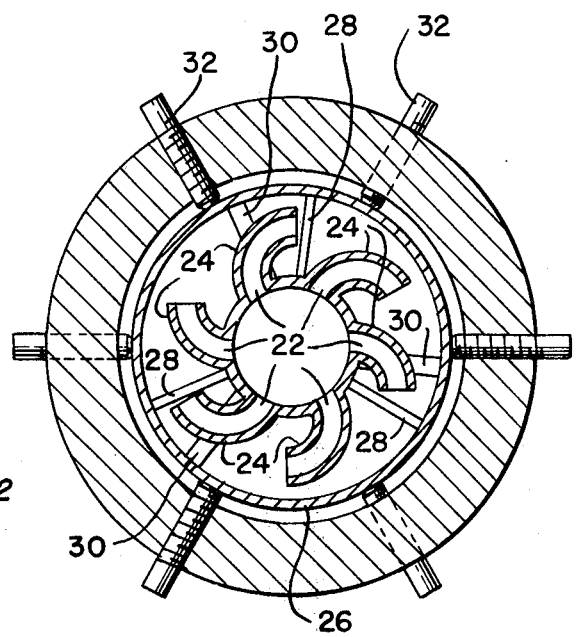

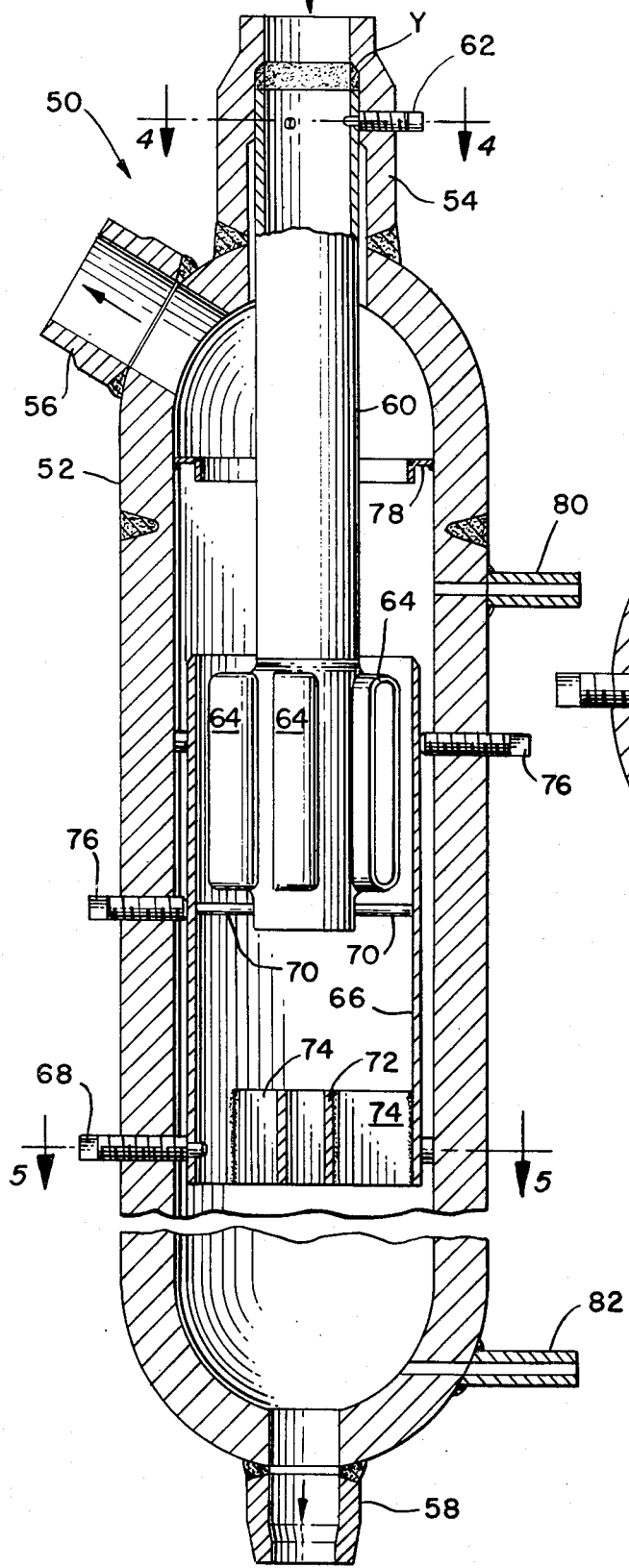
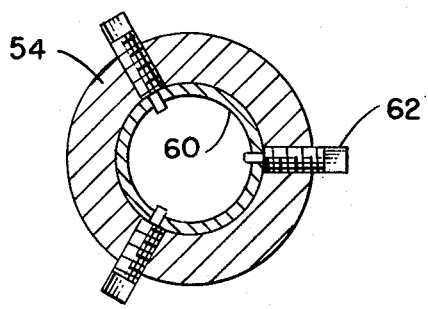
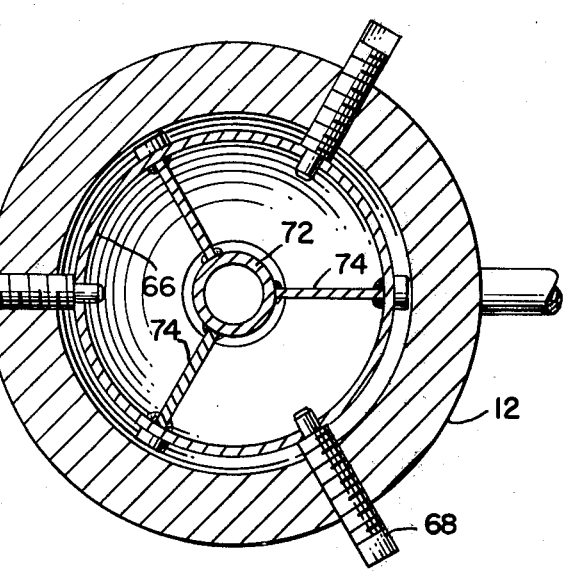

SEPARATOR ARRANGEMENT FOR START-UP SYSTEM

BACKGROUND OF THE INVENTION

This invention relates to a liquid-vapor separator and, more particularly, to a centrifugal type liquid-vapor separator for use in vapor generating systems, or the like, for separating a liquid, such as water, from a vapor, such as steam.

Centrifugal type liquid-vapor separators are well-known and are often utilized in vapor generating systems, or the like, for receiving a mixture of water and vapor from the furnace section of the system and separating the mixture into water and vapor. These type of separators usually employ an upright cylindrical baffle against which a plurality of high velocity tangential streams of the generated liquid-vapor mixture is directed. The heavier liquid is centrifuged out around the baffle and descends along the baffle, while the lighter vapor moves inwardly forming a separate inner layer which rises upwardly. The streams of the liquid-vapor mixture are usually directed toward the baffle through a plurality of arcuate arms which communicate with openings formed in a riser pipe, with the configuration of the openings and arms determining the tangential orientation of the liquid-vapor stream relative to the baffle.

In these arrangements, the liquid-vapor mixture is initially introduced into the lower end of the riser pipe where it rises upwardly before discharging radially outwardly through the openings in the pipe. However, due to the fact that the liquid-vapor mixture flows in an upward direction in the riser pipe, it tends to discharge from the openings in the riser pipe in a slightly upward direction which often results in the vapor, which is separated from the liquid in the foregoing manner, being re-entrained in the liquid, which, of course, reduces the efficiency of the separator.

Also, when these type separators are connected in vapor generation systems, such as, for example, between a downcomer from the furnace section of the generator and a primary superheater inlet, the circuitry involved in making the inlet connection to the lower portion of the separator is relatively complicated.

SUMMARY OF THE INVENTION

It is therefore an object of the present invention to provide a fluid separating apparatus which enjoys an increased efficiency when compared to similar apparatus of the prior art.

It is a further object of the present invention to provide a fluid separating apparatus of the above type in which the circuitry required to connect same in a vapor generation system is relatively simple.

It is a more specific object of the present invention to provide a fluid separating apparatus of the above type in which a mixture of liquid and vapor is introduced into the upper portion of the separator housing for passage downwardly before being separated, to increase the efficiency of the separator.

Toward the fulfillment of these and other objects, the present invention comprises a substantially vertically oriented cylindrical housing, inlet means disposed in the upper portion of the housing for receiving a mixture of liquid and vapor, means in the housing for applying a centrifugal force to the mixture to separate the liquid from the vapor, with the liquid falling to the lower portion of the housing by gravitational forces and the vapor rising to the upper portion of the housing by buoyant forces, an outlet disposed in the lower portion of the housing for permitting the liquid to discharge from the housing, and an outlet formed in the upper portion of the housing to permit the vapor to discharge from the housing.

BRIEF DESCRIPTION OF THE DRAWINGS

The above brief description, as well as further objects, features, and advantages, of the present invention will be more fully appreciated by reference to the following detailed description of a presently preferred but nonetheless illustrative embodiment in accordance with the present invention, when taken in connection with the accompanying drawings wherein:

FIG. 1 is a vertical cross-sectional view of one embodiment of the separator of the present invention;

FIG. 2 is a horizontal cross-sectional view taken along the line 2—2 of FIG. 1;

FIG. 3 is a view similar to FIG. 1 but depicting an alternate embodiment of the separator of the present invention; and FIGS. 4 and 5 are horizontal cross-sectional views taken along the lines 4—4 and 5—5, respectively, of FIG. 3.

DESCRIPTION OF THE PREFERRED EMBODIMENTS

With reference to the drawings, the separator of the present invention is referred to in general by the reference numeral 10 and includes an upright cylindrical shell 12 having a pair of openings extending through its upper end portion which register with an inlet connection 14 and an outlet connection 16, respectively. An additional opening is formed through the lower end portion of the shell 12 and registers with an additional outlet connection 18.

A riser pipe 20 is disposed within the shell 12 in a coaxial relationship thereto, with the upper end portion of the pipe extending within the inlet connection 14, and the lower end portion terminating in the lower portion of the shell. The upper end portion of the pipe 20 is welded to an inner wall portion of the inlet connection 14 along a cylindrical welding surface designated by the reference letter X, and a plurality of spacers 21 extend between the pipe and the corresponding opening in the shell 12.

A plurality of elongated, radially-extending slots 22 (FIG. 2) are formed through the wall portion of the pipe 20 at a point intermediate the ends of the shell 12. The slots 22 are equally spaced around the pipe 20, with six slots being shown disposed at sixty degree intervals for the purposes of example, it being understood that the number of slots and their particular angular disposition can vary in accordance with varying design requirements. Six substantially spiral-shaped arms 24 are connected to the pipe 20 in registry with the slots 22, respectively, with the free ends of the arms being open to permit fluid to discharge therefrom.

A cylindrical, open-ended, baffle, or skirt, 26 extends within the shell 12 and around the intermediate portion of the pipe 20 in a coaxial relationship therewith, with the inner wall of the skirt being spaced a small distance from the free ends of the arms 24. Three rib plates 28 extend between the pipe 20 and the skirt 26 adjacent their respective ends, with the rib plates extending at 120° intervals and being welded along their respective side edges to the pipe and the skirt, to support the skirt relative to the pipe. Three similarly spaced strut rods 30 extend between the pipe 20 and the skirt 26 immediately below the arms 24 to provide further support and raise the natural frequency of the system to reduce vibrations.

A plurality of set screws 32 extend through the shell 12 and engage the skirt 26 to center the assembly formed by the pipe 20, the arms 24, and the skirt within the shell 12. The set screws 32 are in two axially spaced sets of three screws per set, with the screws in each set being spaced at 120° intervals. The set screws 32 permit relative movement between the latter assembly and the shell 12 in an axial direction in response to any differential thermal expansion therebetween.

A plate 34 is disposed in the pipe 20 immediately below the arms 24 to close off the opening in the pipe and thus direct the fluid through the slots 22 and into the arms 24. A drip ring 36 is disposed in the upper portion of the shell 12 above the arms 24.

The shell 12 is provided with a high level connection 38 and a low connection 40 disposed near the upper and lower end portions of the shell, respectively, for the purpose of maintaining predetermined water levels in the shell in a conventional manner.

As a result of the above, when a mixture of water and vapor enters the connection 14 and the upper end portion of the riser pipe 20, it passes downwardly in the pipe and then radially outwardly from the pipe through the slots 22 and into the arms 24, where it is directed tangentially against the inner wall of the skirt 26. This creates a vortex, or whirling stream, of fluid with the resulting centrifugal forces causing the vapor portion of the fluid to travel away from the inner wall of the skirt 26 and towards the center of the whirling stream, from which it passes upwardly by virtue of its buoyancy into the upper portion of the shell 12 and exits via the outlet connection 16. The water portion of the mixture in the whirling stream collects on and flows down the inner wall of the skirt 26 until it falls off the wall, collects in the lower end of the shell 12, and drains from the connection 18.

This type of arrangement results in several advantages. For example, the downward movement of the water-vapor mixture in the pipe 20 decreases the possibility of water re-entrainment and thus improves the performance of the separator. Also, the upper location of the inlet connection 14 simplifies the circuitry utilized to connect the separator to associated equipment, such as to a downcomer extending from the furnace section of a vapor generating system, or the like.

An alternate embodiment of the separator of the present invention is referred to in general by the reference numeral 50 in FIGS. 3 and 4, and includes an upright cylindrical shell 52 having a pair of openings extending through its upper end portion which register with an inlet connection 54 and an outlet connection 56, respectively. An additional opening is formed through the lower end portion of the shell 12 and registers with an additional outlet connection 58.

A riser pipe 60 is disposed within the shell 52 in a coaxial relationship thereto. The upper end portion of the pipe is open and extends within the inlet connection 54, and the lower end portion of the pipe is closed and terminates at an intermediate level of the shell 52. The upper end portion of the pipe 60 is welded to an inner wall portion of the inlet connection 54 along a cylindrical welding surface designated by the reference letter Y. Three externally threaded pins 62 extend through the inlet connection 54 in threaded engagement therewith. As shown in FIG. 4, the pins 62 are spaced at 120° intervals and their end portions extend through the pipe 60 to further secure the pipe relative to the shell 52.

As in the previous embodiment, six spiral shaped arms 64 are equally spaced around the pipe 60 at sixty degree intervals. The arms 64 are connected to the pipe 60 in registry with corresponding slots formed through the pipe 60, with the free ends of the arms being open to permit fluid to discharge therefrom.

A cylindrical, open-ended, baffle, or skirt, 66 extends within the shell 52 and around the intermediate portion of the pipe 60 in a coaxial relationship therewith, with the inner wall of the skirt being spaced a small distance from the free ends of the arms 64. The skirt 66 is supported by three set screws 68 extending through the shell 52 and the skirt. As shown in FIG. 5, the set screws 68 are angularly spaced at approximately 120° intervals and have a projecting portion of a reduced diameter extending through the skirt 66. Three spaced strut rods 70 extend between the pipe 60 and the skirt 66 immediately below the arms 64 and are spaced at approximately 120° intervals to center the pipe in a coaxial relation to the skirt.

A pipe 72 is supported within the lower end portion of the skirt 66 by three rib plates 74 extending between the pipe and the skirt 66, to reduce vibrations of the skirt. The rib plates 74 extend at 120° intervals and are welded along their respective side edges to the pipe 72 and the skirt 66.

A plurality of set screws 76 extend through the shell 52 and engage the skirt 66 to center the assembly formed by the pipe 60, the arms 64, and the skirt within the shell. It is understood that the set screws 76 are arranged similarly to the set screws 32 of the previous embodiment, i.e. in two axially spaced sets of three screws per set, with the screws in each set being spaced at 120° intervals.

A drip ring 78 is disposed in the upper portion of the shell 52 above the arms 64, and the shell 52 is provided with a high level connection 80 and a low level connection 82 disposed near the upper and lower end portions of the shell, respectively, for the purpose of maintaining predetermined water levels in the shell, as in the previous embodiment.

It is thus seen that, according to the embodiment of FIGS. 3–5, any differential thermal expansion in an axial direction is accommodated by movement of the riser pipe 60 and the arms 64 relative to the assembly formed by the skirt 66 and the shell 52.

The operation of the embodiment of FIGS. 3–5 is otherwise identical to that of the previous embodiment and enjoys the advantages of same, as discussed above.

It is understood that several variations may be made in the foregoing without departing from the scope of the invention. For example, the set screws 62 in the embodiment of FIGS. 3–5 can be utilized in the same manner in the embodiment of FIGS. 1 and 2. Also, the separators of both embodiments are not limited to use with water, but can be utilized to separate other liquids and vapors.

Of course, still other variations of the specific construction and arrangement of the apparatus disclosed above can be made by those skilled in the art without departing from the invention as defined in the appended claims.

What is claimed is:

1. A fluid separating apparatus comprising a substantially vertically oriented cylindrical housing, inlet means disposed in the upper portion of said housing for receiving a mixture of liquid and vapor, a riser pipe disposed in said housing and communicating with said inlet means for receiving said mixture, at least one discharge slot formed through said riser pipe, a skirt disposed in said housing and extending between said riser pipe and the inner wall of said housing, said skirt surrounding said slot and forming a solid baffle, an arcuate shaped discharge member registering with said at least one slot for receiving said mixture and discharging it against said skirt to create centrifugal forces to facilitate the separation of said liquid from said vapor, said liquid collecting on said skirt and falling to the lower portion of said housing by gravitational forces and said vapor rising to the upper portion of said housing by buoyant forces, an outlet disposed in the lower portion of said housing for permitting the liquid to discharge from the housing, an outlet formed in the upper portion of said housing to permit the vapor to discharge from the housing and means for supporting said riser pipe relative to said housing while permitting relative movement between said riser pipe and said housing in an axial direction in response to relative thermal expansion and contraction therebetween.

2. The apparatus of claim 1 wherein there are a plurality of slots formed through said riser pipe in an angularly spaced relation and a plurality of said discharge members respectively registering with said slots.

3. The apparatus of claim 1, further comprising means for securing said skirt relative to said housing in a manner so that said riser pipe moves relative to said skirt and said housing in an axial direction in response to said thermal expansion and contraction.

4. A fluid separating apparatus comprising a substantially vertically oriented cylindrical housing, inlet means disposed in the upper portion of said housing for receiving a mixture of liquid and vapor, a riser pipe disposed in said housing and communicating with said inlet means for receiving said mixture, at least one discharge slot formed through said riser pipe, a skirt disposed in said housing and extending between said riser pipe and the inner wall of said housing, said skirt surrounding said slot and forming a solid baffle an arcuate shaped discharge member registering with said at least one slot for receiving said mixture and discharging it against said skirt to create centrifugal forces to facilitate the separation of said liquid from said vapor, said liquid collecting on said skirt and falling to the lower portion of said housing by gravitational forces and said vapor rising to the upper portion of said housing by buoyant forces, an outlet disposed in the lower portion of said housing for permitting the liquid to discharge from the housing, an outlet formed in the upper portion of said housing to permit the vapor to discharge from the housing, and means for securing said skirt relative to said riser pipe for movement therewith relative to said housing in an axial direction in response to relative thermal expansion and contraction between said riser pipe and said housing.

5. The apparatus of claim 4, further comprising means within said housing for engaging said skirt to support said skirt relative to said housing while permitting said movement.

6. The apparatus of claim 4, wherein there are a plurality of slots formed through said riser pipe in an angularly spaced relation and a plurality of said discharge members respectively registering with said slots.

* * * * *

UNITED STATES PATENT AND TRADEMARK OFFICE
Certificate

Patent No. 3,992,172                                Patented November 16, 1976

Charles R. Clark

Application having been made by Charles R. Clark, the inventor named in the patent above identified, and Foster Wheeler Energy Corporation, Livingston, New Jersey, a corporation of Delaware, the assignee, for the issuance of a certificate under the provisions of Title 35, Section 256, of the United States Code, adding the name of Joseph Zomnir as a joint inventor, and a showing and proof of facts satisfying the requirements of the said section having been submitted, it is this 10th day of October 1978, certified that the name of the said Joseph Zomnir is hereby added to the said patent as a joint inventor with the said Charles R. Clark.

FRED W. SHERLING,
*Associate Solicitor.*